United States Patent
Feldtkeller (12)

(10) Patent No.: US 6,239,990 B1
(45) Date of Patent: May 29, 2001

(54) SWITCHED-MODE POWER SUPPLY AND METHOD FOR DRIVING A SWITCH IN A SWITCH-MODE POWER SUPPLY FOR IMPROVED SWITCH-ON AFTER A WAITING PERIOD OR DISCONNECTION FROM THE NETWORK

(75) Inventor: Martin Feldtkeller, Munich (DE)

(73) Assignee: Infineon Technologies Aktiengesellschaft, Munich (DE)

( * ) Notice: Subject to any disclaimer, the term of this patent is extended or adjusted under 35 U.S.C. 154(b) by 0 days.

(21) Appl. No.: 09/552,496

(22) Filed: Apr. 19, 2000

(30) Foreign Application Priority Data

Apr. 21, 1999 (DE) ............................. 199 18 041

(51) Int. Cl.[7] .................................................. H02M 3/335
(52) U.S. Cl. ............................................................ 363/21.1
(58) Field of Search ........................... 363/21.1, 20, 131, 363/97

(56) References Cited

U.S. PATENT DOCUMENTS 4,187,536 * 2/1980 Govaert et al. ....................... 363/21
4,704,670 * 11/1987 Gradl et al. ............................ 363/21
6,009,000 * 12/1999 Siri ......................................... 363/21

FOREIGN PATENT DOCUMENTS 0 259 775   3/1988   (EP).

OTHER PUBLICATIONS

Stromversorgung–Dipl.–Ing. Wilfried Blaesner–Erhöhte Betriebssicherheit und niedrigere Kosten–Elektronik Sep. 27, 4, 1990–pp. 134–140.

* cited by examiner

Primary Examiner—Shawn Riley
(74) Attorney, Agent, or Firm—Schiff Hardin & Waite

(57) ABSTRACT

A switched-mode power supply with a switch for applying a supply voltage to a primary coil of a transformer based on the criterion of a drive signal. A pulse-width modulator has supplied a first regulating signal that is dependent on an output voltage and a first current signal that is dependent on a voltage through the primary coil for providing the drive signal. A second regulating signal that is variable in dependency on the current through the primary coil is also supplied to the pulse-width modulator in addition to the first regulating signal and first voltage signal. A method is provided for driving the switch in a switched-mode power supply.

14 Claims, 2 Drawing Sheets

SWITCHED-MODE POWER SUPPLY AND METHOD FOR DRIVING A SWITCH IN A SWITCH-MODE POWER SUPPLY FOR IMPROVED SWITCH-ON AFTER A WAITING PERIOD OR DISCONNECTION FROM THE NETWORK

BACKGROUND OF THE INVENTION

The invention relates to a switched-mode power supply with a switch for applying a supply voltage to a primary coil of a transformer based on a drive signal fed to a pulse-width modulator. A first regulating signal that is dependent on an output voltage and a voltage signal that is dependent on a current through the primary coil is supplied to the pulse-width modulator for providing the drive signal.

Such switched-mode power supplies serve the purpose of supplying a consumer or load with a d.c. voltage, the load being connected to an output terminal of the switched-mode power supply at the secondary side. This d.c. voltage at the output side is to be kept substantially constant in a load-independent manner. For purposes of generating the output voltage, the primary coil absorbs energy via the supply voltage given a closed switch and outputs this energy via the secondary coil of the transformer and a rectifier arrangement to the load after the switch has been opened. Given switched-mode power supplies of fixed frequency, the switch is closed based on of the drive signal in periodical time intervals, whereby the periods of the individual drive input pulses vary in dependency on the output voltage and become longer with reduced output voltage or increasing load. What is referred to as "current-mode-regulation" is applied with respect to these switched-mode power supplies, which are particularly utilized in monitors and television apparatuses, for purposes of generating the drive input pulses in the pulse-width modulator. Thereby, the switch remains closed until the current through the primary coil or the current signal dependent on this current reaches the value of the regulating signal, which current increases subsequent to the switching-on.

Problems can arise with respect to a short-circuit at the output side when the transformer cannot output As energy to the load during the switch pauses. The current increases almost up to the value at which the switching-off has been carried out given the next closing of the switch. Therefore, the ON-time becomes extremely short given ideally functioning switched-mode power supplies. However, the signal propagation time determined by the signal processing in the pulse-width modulator—from reaching the switch-off value of the current signal until switching-off the switch—determines the minimal ON-time of the switch in practical operation. Therefore, the primary current further increases between the switch-off threshold is attained and the actual switching of the switch. When the transformer absorbs more energy during the ON-times of the switch than it can output to the secondary side in the switch pauses, the magnetization of the primary coil and therefore the primary current increases up to a point at which components are destroyed. Such known switched-mode power supplies provide a second operating point for purposes of preventing a destruction, whereby the switched-mode power supply is switched off by means of the current signal given exceeding of the operating point for the first time. Then, it can only be switched on again after a waiting period or after it has been disconnected from the network.

SUMMARY OF THE INVENTION

It is an object of the invention to solve the above-mentioned problem relative to switching on again after a waiting period or after it has been disconnected from the network.

In contrast thereto, the invention provides a second regulating signal for generating the drive signal, which is variable dependent on the current through the primary coil. The second regulating signal, as the first regulating signal, prescribes a switch-off threshold, whereby the switch is to be opened based on the criterion of the drive signal when the voltage signal representative of the current reaches the switch-off threshold. The determining factor for the switching-off is the regulating signal, the value of which is reached first by the voltage signal representative of the current. While the first regulating signal that is dependent on the output voltage assumes a large value in the case of a short-circuit in order to generate long drive input pulses and in order to maintain the output voltage, the second regulating signal can be reduced dependent on the current through the primary coil, in this case in order to achieve shorter ON-times. The second regulating signal is dimensioned such that it assumes a constant value given proper operation (no short-circuit) of the switched-mode power supply, which value lies above the value of the first regulating signal, so that it therefore does not influence the ON-times.

An embodiment of the invention provides a signal generation arrangement with an output terminal at which the second regulating signal can be picked off, and with an input terminal. A voltage signal that is dependent on the current through the primary coil can be supplied to the input. Preferably, the voltage singal representative of the current signal is the same voltage signal representative of the current, which is also supplied to the pulse-width modulator for purposes of generating the drive signal.

Advantageously, the signal generation arrangement has a series connection of a current source and a capacitance between a supply potential and a reference potential, whereby the second regulating signal can be picked off as a voltage across the capacitance. A second switch connected that is connected parallel to the capacitance is provided for purposes of changing the second regulating signal, this second switch being operated based on the criterion of a second drive signal that is dependent on the current through the primary coil or on the voltage signal dependent on the current in order to discharge the capacitance and thus reduce the second regulating signal.

For purposes of providing the second regulating signal and therefore for driving the switch, a comparing arrangement is preferably provided, which compares the voltage signal dependent on the current to a reference signal and which then closes the switch in order to discharge the capacitance when the voltage signal dependent on the current exceeds the reference signal. The switch is preferably designed such that a resistor in its load path can be adjusted dependent on the second drive signal in order to discharge the capacitance more quickly when the second drive signal is large and vice versa.

According to an embodiment of the invention, the comparing arrangement is designed as a trans-conductance amplifier to which the voltage signal dependent on the current and the reference signal can be supplied at input terminals, and the switch is designed as a bipolar transistor. A current that increases with increasing difference of the signals at the input can be picked off at the output of the trans-conductance amplifier. This current is supplied to the base of the bipolar transistor, which therefore conducts the better the higher the difference of the input signals is, in order to discharge the capacitance more quickly and thus lower the operating point prescribed by the second regulating signal more quickly.

Another embodiment of the invention utilizes a field-effect transistor as a switch and a difference amplifier as a comparing arrangement. The difference amplifier transforms a difference of the signals at the input into an output voltage with which the field-effect transistor is driven, so that the field-effect transistor conducts the better higher the output voltage of the difference amplifier is.

Also according to the invention, a method is provided for purposes of driving a switch in a switched-mode power supply, which switch is connected in series to a primary coil. The method provides the generation of drive signals for the switch based on the criterion of a first regulating signal that is dependent based on an output signal, on the criterion of a first voltage signal that is dependent on a current through the primary coil, and based on the criterion of a second regulating signal. The second regulating signal can be adjusted according to the current through the primary coil.

Thus, it is particularly provided to only change the second regulating signal, in particular, to reduce it, when the current through the primary coil or, respectively, a first voltage signal on a second voltage signal exceeds a reference value. In an alternate embodiment, the second voltage signal can be identical to or different than the first voltage signal, in particular. According to the inventive method, the drive input pulses for the switch start within firmly fixed time intervals, and end when the first voltage signal reaches the value of the first regulating signal or of the second regulating signal. The second regulating signal is particularly dimensioned such that it is larger than the first regulating signal with respect to normal operation of the switched-mode power supply, so that it does not influence the generation of the drive input pulses. Given a short-circuit at the output side, the current through the primary coil increases extremely fast after the switch has been closed and the second reference signal is reduced when the voltage signal exceeds the value of the reference signal. When the second regulating signal becomes smaller than the first regulating signal, the second regulating signal determines the duration of the drive input pulses, which are reduced, since the operating point is reached earlier. The second regulation signal is preferably designed such that it increases again when the first voltage signal (or second voltage signal in the alternate embodiment) is less than the reference signal.

Advantageous embodiments of the invention are subsequently explained in greater detail on the basis of exemplary embodiments shown in the drawing figures.

BRIEF DESCRIPTION OF THE DRAWINGS

FIG. 1A is an alternative embodiment of FIG. 1; and

DESCRIPTION OF THE PREFERRED EMBODIMENTS

Figure 1:
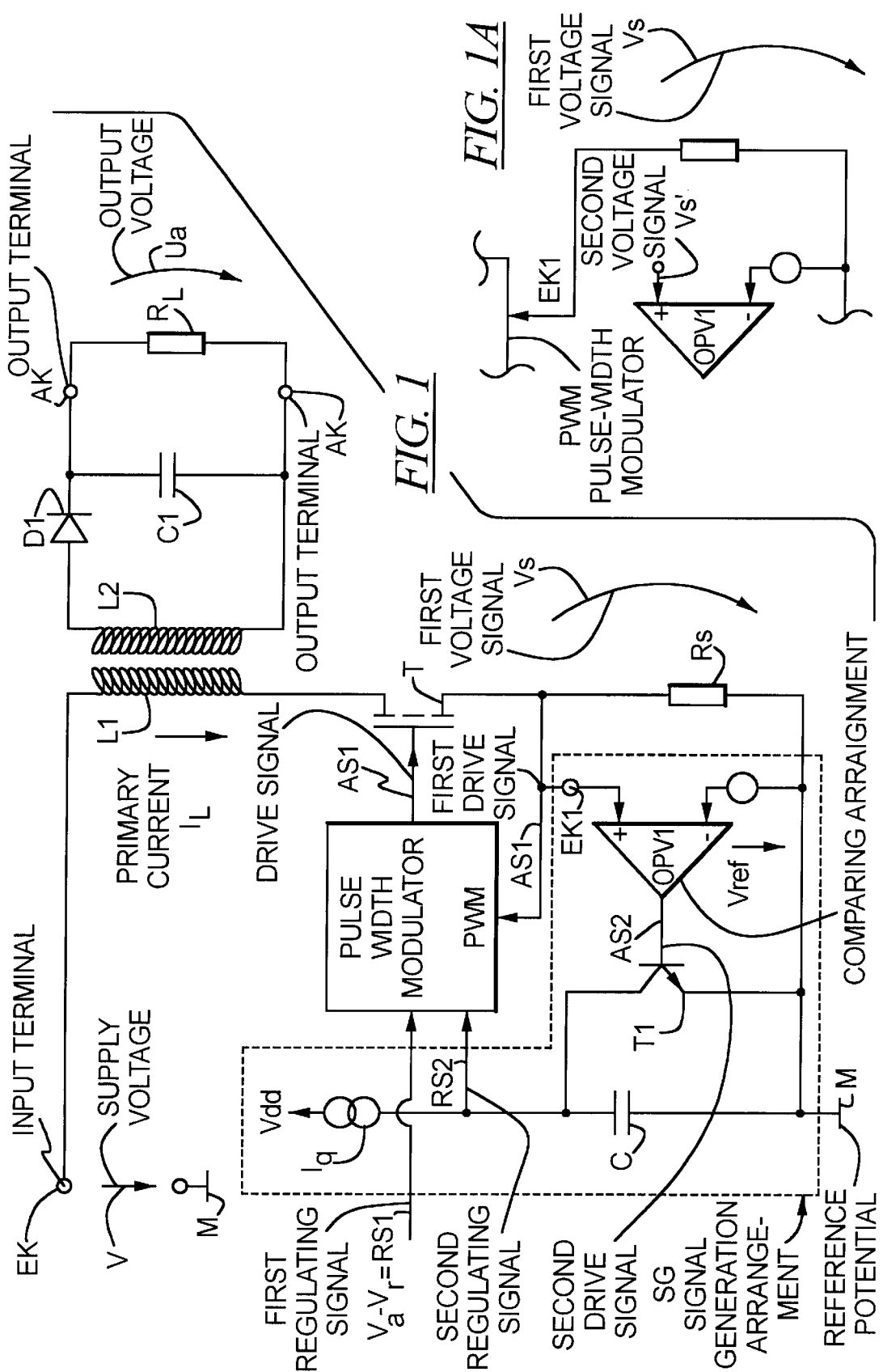
FIG. 1 is a schematic diagram of a switched-mode power supply according to a first embodiment of the invention.

As long as not indicated otherwise, identical components and function units have identical reference characters in the Figures.

FIG. 1 shows a first exemplary embodiment of an inventive switched-mode power supply. The switched-mode power supply comprises a static switch T that is designed as a field-effect transistor in the exemplary embodiment and that has its load path connected in series to a primary coil L1 of a transformer in order to apply a supply voltage V present at input terminals EK of the switched-mode power supply to the primary coil L1. A rectifier arrangement with a diode D1 and a capacitance C1 is connected downstream relative to a secondary coil L2 of the transformer. A load $R_L$ that is exemplarily provided as an ohmic resistor in the exemplary embodiment can be connected parallel to the capacitance C1 at output terminals AK. Thus, an output voltage that is at least approximately load-independent is available at the load $R_L$.

When the static switch T is closed, the primary coil L1 absorbs energy via the supply voltage V and outputs this energy to the load $R_L$ via the secondary coil L2 and the rectifier arrangement D1, C1 after the switch T has been opened. The absorbed energy and therefore the output voltage Ua is dependent on the switching frequency and the ON-times of the static switch T. The driving of the switch occurs based on the criterion of a drive signal AS1 that is provided by a pulse-width modulator PWM and that is composed of a chronological sequence of drive input pulses during which the static switch T is closed. Given the shown switched-mode power supply, the drive input pulses start on the criterion of an oscillator cycle that is internally generated in the pulse-width modulator PWM in firmly fixed time intervals. The duration of the drive input pulses depends on a first regulating signal RS1, a first voltage signal Vs dependend on the current $I_L$ as a first drive signal AS1 and a second regulating signal RS2, which are supplied to the pulse-width modulator PWM.

When the static switch T is closed on the criterion of the oscillator cycle, a current $I_L$ through the primary coil L1 starts to increase in an approximately linear manner given proper operation of the switched-mode power supply. The current $I_L$ through the primary coil L1 is acquired by a current measuring arrangement, which is connected in series relative to the primary coil L1 and which is designed as an ohmic resistor in the example. The voltage Vs that is dependent on the current $I_L$ is supplied to the pulse-width modulator PWM as a current measuring signal, which pulse-width modulator PWM is connected to a terminal of the resistor Rs by means of a connecting terminal. The drive input pulse and therefore the ON-time of the static switch ends when the first drive signal (As1 represented by voltage Vs dependent on the current $I_L$ has been increased up to a point at which it reaches the first regulating signal RS1 or the second regulating signal RS2.

The first regulating signal RS1 is dependent on the output voltage Ua and is larger, the smaller the output voltage Ua is. In the most simple case, the first regulating signal RS1 is formed by subtracting the output voltage Ua from a reference voltage $V_R$. The first regulating signal RS1 becomes larger when the output voltage Ua reduces by increasing the load $R_L$ or by reducing the supply voltage V. As long as the first regulating signal RS1, apart from the voltage Vs dependent on the current $I_L$, is the determining factor for generating the drive input pulses, the duration of the drive input pulses becomes longer as a result whereof the primary coil L1 absorbs more energy and outputs it to the secondary side in order to maintain the output voltage there.

According to the present invention, a second regulating signal RS2 is provided for purposes of generating the drive signal in the pulse-width modulator PWM, which regulating signal RS2 is provided by a signal generation arrangement SG at an output terminal AK1 and which is supplied to the pulse-width modulator. A first voltage signal Vs that is dependent on the current $I_L$ through the primary coil L1 is supplied to an input terminal EK1 of the signal generator, which first voltage signal (in the exemplary embodiment) is identical with the voltage Vs dependent on the first voltage signal supplied to the pulse-width modulator.

The signal generation arrangement SG comprises a series connection of a current source Iq and a capacitance C between a supply potential Vdd and a reference potential M, whereby the second regulating signal RS2 can be picked off as a voltage across the capacitance C, and the output terminal is connected to a node that is common to the capacitance C and the current source Iq. A switch that is designed as a bipolar transistor T1 is connected parallel to the capacitance C, which switch can be driven dependent on the criterion of a second drive signal AS2. The drive signal AS2 is available at an output terminal of a comparing arrangement OPV1, whereby the voltage Vs dependent on the current $I_L$ and a reference signal Vref are supplied thereto. In the exemplary embodiment, the comparing arrangement OPV1 is designed as a trans-conductance amplifier, whereby an output current forming the second regulating signal RS2 is dependent on the difference of the voltage Vs dependent on the current $I_L$ and the reference signal Vref. The more the voltage signal Vs exceeds the reference signal Vref the better is the conductivity of the transistor T in order to discharge the capacitance and to reduce the second regulating signal RS2.

The utilization of the second regulating signal RS2 serves the purpose of improving the short-circuit behavior of the switched-mode power supply of the invention, as will be explained in the following.

When a short-circuit is present at the output side, the first regulating signal RS1 assumes a maximum value; this would lead to long drive input pulses as mentioned above. On the other hand, the primary coil L1 can hardly output energy to the secondary side in this case, since the only load is the diode D1 in this case. After the switch T has been switched on again, the primary current $I_L$ then assumes the value again at which the switching-off was carried out before. The operating point of the first regulating signal RS1 is reached by the voltage signal Vs accordingly fast and the static switch T is switched off. Due to unavoidable signal propagation times, the primary current $I_L$ still increases between reaching the operating point and switching-off of the static switch T. When the primary coil absorbs more energy during the ON-times than it can output during switch pauses, the primary current $I_L$ would continue increasing and lead to a destruction of the components when a switching-off only occurred on the criterion of the first regulating signal RS1 and the current signal. This is prevented by means of the second regulating signal RS2.

The second regulating signal RS2 assumes as a maximum a value that results from the difference between supply potential Vdd and reference potential M. In normal operation—without a short-circuit—the second regulating signal RS2 increases up to this value, which is preferably selected such that it lies above the maximum value of the first regulating signal RS1, so that the driving of the static switch in not influenced in this case. When the primary current $I_L$ increases extremely fast with respect to a short-circuit at the output side and when the voltage signal Vs exceeds the value of the reference signal Vref while the static switch T is still closed, the transistor T1 becomes conducting in order to discharge the capacitance C and therefore reduces the second regulating signal RS2. Thus, the transistor T1 remains conducting until the static switch T switches-off and primary current $I_L$ no longer flows.

The load current of the capacitance fixed by the current source Iq and the discharge rate across the transistor T1 are tuned to one another such that the second regulating signal RS2 reduces to a value that is below the first regulating signal RS1.

The points in time at which the static switch T switches off are then prescribed by the voltage signal Vs and the second regulating signal RS2, since the regulating signal, whose value is reached first by the voltage signal Vs, is the determining factor for the switching-off of the static switch T or for the end of the drive input pulses. The duration of the switch-on input pulses of the static switch T is shortened as a result thereof.

Primary current $I_L$ does not flow after the static switch T has been opened and the transistor T inhibits again, as a result of which the capacitance C is loaded again by means of the current source Iq, and the value of the second regulating signal RS2 increases again. When the current signal Vs exceeds the value of the reference signal Vref again with respect to the next switching-on, the second regulating signal RS2 is reduced again. Thus, the capacitance is discharged over a plurality of periods up to a point at which drive input pulses arise that are sufficiently short. The switched-mode power supply of the invention is able to tolerate temporary short-circuits, conditioned by a short-term falling of the load $R_L$. When a short-circuit is no longer present or when the voltage signal Vs no longer exceeds the reference signal Vref during the ON-times, the second regulating signal RS2 increases up to its output value above the value of the first regulating signal RSl, which then determines the end of the drive input pulses together with the voltage signal Vs.

In the switched-mode power supply of the invention, the duration of the switch-on input pulses continues to slowly increase due to the second regulating signal RS2 when switching on the power supply. Given switching-on, when the capacitance C is still discharged, the second regulating signal RS2 increases in dependency on the value of the capacitance C and the value of the current supplied by the current source Iq and, apart from the voltage signal Vs, determines, up to a point at which it exceeds the first regulating signal RS1, the duration of the drive input pulses. Given switching-on, high primary currents $I_L$, which derive from the capacitance C1 of the rectifier arrangement being also unloaded and initially representing a short-circuit when the switched-mode power supply is started, are thus avoided.

FIG. 1A shows the aforementioned alternate embodiment in which a second voltage signal Vs' is supplied to the comparing arrangement OPV1 which is different than the first voltage signal Vs. In the FIG. 1 embodiment, the first and second signal voltages Vs and Vs' respectively are the same.

Figure 2:
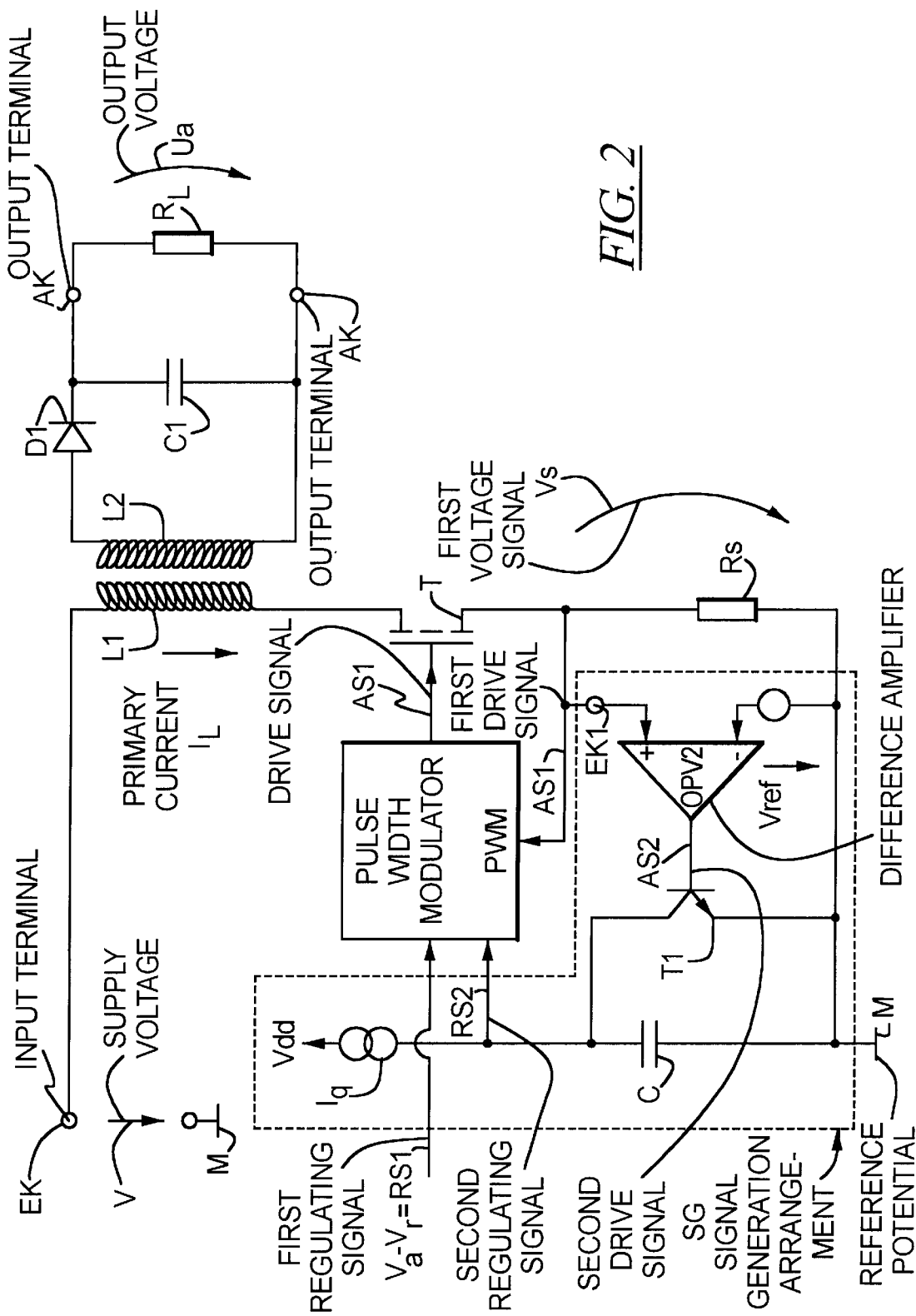
FIG. 2 is a schematic diagram of a switched-mode power supply according to a second embodiment of the invention.

FIG. 2 shows a further exemplary embodiment of the switched-mode power supply of the invention, whereby a field-effect transistor T2, as a switch, is connected parallel to the capacitance C. A difference amplifier OPV2 having the current signal and the reference signal Vref supplied at input terminals is provided for purposes of driving the field-effect transistor T2. A voltage as the second drive signal AS2 at the output of the difference amplifier OPV2 is larger, the larger the difference is between the voltage signal Vs (that is the first drive signal As1) and the reference signal Vref. The capacitance is discharged more quickly via the field-effect transistor T2 with increasing second drive signal AS2.

Another embodiment (not shown in greater detail) provides a comparator as a comparing arrangement. As a result thereof, the capacitance is always discharged with the same voltage when the current signal representing the current exceeds the reference signal.

The switched-mode power supply of the invention makes it possible to drive the static switch T according to the inventive method, namely on the criterion of a first regulating signal RS1 that is dependent on an output voltage Ua, on the criterion of a first voltage signal Vs and on a second regulating signal RS2 that is variable in dependency on the voltage signal Vs. In the shown exemplary embodiments, the first voltage signal Vs is compared to a reference signal Vref for purposes of changing the voltage signal, and the second regulating signal RS2 is reduced when the voltage signal Vs exceeds the reference signal Vref.

Although various minor modifications might be suggested by those skilled in the art, it should be understood that my wish to embody within the scope of the patent warranted hereon all such modifications as reasonably and properly come with the scope of my contribution to the art.

I claim as my invention:

1. A switched-mode power supply, comprising:
   a switch for applying a supply voltage to a primary coil of a transformer based on a criterion of a drive signal;
   a pulse-width modulator for providing a drive signal to the switch and having supplied thereto a first regulating signal dependent on an output voltage and a first first voltage signal which is dependent on a current through the primary coil; and
   a second regulating signal which is variable in dependency on the current through the primary coil also being supplied to the pulse-width modulator in addition to the first regulating signal and the first drive signal.

2. The switched-mode power supply according to claim 1 wherein a signal generation arrangement is connected to the pulse-width modulator with an output terminal at which the second regulating signal is picked off and with an input terminal to which is supplied said first voltage signal dependent on the current through the primary coil.

3. The switched-mode power supply according to claim 2 wherein the second regulating signal which is variable is based on the second voltage signal different than the first voltage signal which is fed to the pulse width modulator, said second voltage signal also being dependent on and representative of the current through the primary coil.

4. The switched-mode power supply according to claim 2 wherein the signal generation arrangement comprises a series connection of a current source and a capacitance connected between a supply potential and a reference potential, whereby the second regulating signal is picked off as a voltage across the capacitance.

5. The switched-mode power supply according to claim 4 wherein a second switch is connected parallel to the capacitance, which second switch is driven based on a criterion of a second drive signal dependent on the first voltage signal.

6. The switched-mode power supply according to claim 5 wherein the signal generation arrangement comprises a comparing arrangement for generating the second drive signal by means of comparing the first voltage signal to a reference signal.

7. The switched-mode power supply according to claim 6 wherein the comparing arrangement is designed as a transconductance amplifier and the second switch is designed as a bipolar transistor.

8. The switched-mode power supply according to claim 6 wherein the comparing arrangement is designed as a difference amplifier and the second switch is designed as a field-effect transistor.

9. A method for driving a switch connected in series to a primary coil in a switched-mode power supply, comprising the steps of:
   generating a drive signal for driving the switch based on a criterion of a first regulating signal dependent on an output voltage and on a criterion of a voltage signal dependent on a current through the primary coil; and
   the generation of the drive signal also being based on a criterion of a second regulating signal in addition to the first regulating signal and the voltage signal, which is adjusted according to the current through the primary coil.

10. A method according to claim 9 wherein the adjustment of the second regulating signal comprises the following method steps:
    comparing the voltage signal to a reference signal; and
    reducing the second regulating signal when the voltage signal exceeds the reference signal.

11. The method according to claim 10 wherein the second regulating signal is reduced in dependency on a difference between the first voltage signal and the reference signal.

12. The method according to claim 9 wherein the generation of the drive signal comprises the method steps of:
    generating a chronological sequence of drive input pulses that respectively start based on a criterion of an oscillator cycle and that respectively end when the first voltage signal reaches a value of the first regulating signal or of the second regulating signal.

13. A switched-mode power supply, comprising:
    a switch for applying a supply voltage to a primary coil of a transformer based on a drive signal;
    a pulse-Width modulator for providing a drive signal to the switch and having supplied thereto a first regulating signal dependent on an output voltage and a voltage signal dependent on a current through the primary coil; and
    a second regulating signal also supplied to the pulse-width modulator and developed by comparison to a reference and which is variable in dependency on the current through the primary coil.

14. A method for driving a switch connected in series to a primary coil in a switched-mode power supply, comprising the steps of:
    generating a drive signal for driving the switch based on a first regulating signal dependent on an output voltage and on a voltage signal dependent on a current through the primary coil; and
    the generation of the drive signal also being based on a second regulating signal developed by comparison to a reference and which is adjusted according to the current through the primary coil.

* * * * *